3,470,958
WELL STIMULATION WITH HYDROPHILIC FLUIDS
Wilson L. Kinney, Robinson, Ill., assignor to Marathon Oil Company, Findlay, Ohio, a corporation of Ohio
No Drawing. Filed Mar. 12, 1968, Ser. No. 712,344
Int. Cl. E21b 43/25
U.S. Cl. 166—305                                    15 Claims

ABSTRACT OF THE DISCLOSURE

Crude oil production from a producing means in fluid communication with an oil-bearing subterranean formation is improved by injecting into the well bore from about 0.5 to about 10 barrels of an oil-external micellar dispersion per vertical foot of oil-bearing sand and then injecting sufficient crude oil into the well bore to displace the micellar dispersion out into the reservoir, and thereafter returning the well to production. Such a process, inter alia, improves the relative permeability to crude oil in the area immediately adjacent to the well bore.

Background of the invention

Blair et al., in United States Patent No. 2,356,205 teaches that productivity of a producing well can be increased by removing wax-associated occlusions within the immediate vicinity of the well bore. This is accomplished by contacting the strata with a micellar solution, permitting the well to back flow and removing the objectionable components up-hole.

United States Patent No. 3,254,714, to Gogarty, et al. teaches a secondary-type recovery process wherein a micellar solution slug is injected into a petroleum reservoir and displaced toward a production well to recover crude oil therefrom. This process is especially effective in tertiary oil recovery.

Applicant has discovered that a miniscule amount of micellar dispersion can be used to increase the productivity of a production well. It is postulated, inter alia, that the relative permeability to oil is improved and such facilitates the flow of crude oil to the well bore.

Description of invention

The micellar dispersions of this invention are oil-external and are preferably hydrophilic. That is, it is preferred that these micellar dispersions readily take up water.

The term "micellar dispersion" as used herein is meant to include micellar solutions, "micro-emulsions" [Schulman and Montagne, Annals of the New York Academy of Sciences, 92, pages 366–371 (1961)], "transparent" emulsions (Blair, Jr. et al., United States Patent No. 2,356,205) and micellar dispersion technology taught by C. G. Sumner, Clayton's, The Theory of Emulsions and Their Technical Treatment, 5th edition, pp. 315–320 (1954). Examples of useful micellar solutions include those taught in United States Patents Nos. 3,254,714; 3,275,075; 3,301,325; and 3,307,628. Micellar dispersions differ from emulsions in many ways, the strongest differentation being that the former are thermodynamically stable whereas the latter are not.

The micellar dispersion is composed essentially of hydrocarbon, an aqueous medium (e.g. water, brackish water and brine water), surfactant sufficient to impart desired characteristics to the dispersion, and optionally cosurfactant and/or electrolyte. Examples of volume amounts include from 4 to about 80% hydrocarbon, from about 10% to about 90% aqueous medium, at least about 4% surfactant, from about 0.01% to about 20% of the cosurfactant and from about 0.001% to about 4% by weight of electrolyte. In addition, the micellar dispersion can contain other additives such as corrosion inhibiting agents, bactericides, etc.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft water, brackish water or a brine water. Preferably, the water is soft but it can contain small amounts of salts which are characteristic of the subterranean formations being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate, laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12–50 (a 50% active dodecyl trimethyl ammonium chloride marketed by Armour Chemical Company, Chicago, Ill.), and like materials.

Preferably, the surfactant is a petroleum sulfonate, also known as alkyl aryl naphthenic sulfonate, and preferably containing an alkali cation. Examples of preferred surfactants are the sodium and ammonium petroleum sulfonates having an average molecular weight of from about 360 to about 520, and more preferably from about 380 to about 440, the latter being more hydrophilic. The surfactant can be a mixture of low and high molecular weight sulfonates or a mixture of two or more different surfactants.

The cosurfactants or cosolubilizers useful with the invention include alcohols, amino compounds, esters, aldehydes and ketones containing from 1 to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include isopropanol, primary butanols, primary pentanols and primary and secondary hexanols. Concentrations of from about 0.01% to about 20% by volume of cosurfactant are useful in the micellar dispersion and more preferably from about 0.1 to about 5.0%. Mixtures of two or more cosurfactants are useful.

Examples of useful electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in United States Patent No. 3,330,344. The type and concentration of electrolyte will depend on the aqueous medium, surfactant, cosurfactant, hydrocarbon and the reservoir temperature and connate water of the reservoir. Generally from about 0.001% to about 4% or more by weight of electrolyte is useful. Micellar dispersions containing hydrophilic surfactants and high reservoir temperatures preferably dictate the use of acids or salts. The electrolyte can be the salts within brackish or brine water.

The mobility of the oil-external micellar dispersion is desirably about equal to or less than the mobility of the formation fluids (i.e. combination of crude oil and interstitial water).

The amount of the micellar dispersion injected into the well bore should be sufficient to displace substantially all the water in at least a 3 feet radius and up to about 20 feet in radius outwardly from the well bore. Generally, from about 0.5 to about 10 barrels of the dispersion per vertical foot of oil-bearing sand is sufficient to effect improved productivity of the producing well and preferably from about 1 to about 5 barrels give good results.

Preferably, the dispersion is injected at a pressure less than the formation fracture pressure. After the micellar dispersion is injected into the reservoir, it can remain in contact with the area immediately adjacent the well bore for about six hours and more preferably to about 12 hours. Such contact time assures a more complete "water solubilization" or "take-up" of the formation water by the micellar dispersion.

The hydrocarbon injected after the micellar dispersion is preferably compatible with the crude oil being produced by the producing well. Preferably, it is crude oil and more preferably obtained from the existing production well. Preferably, the micellar dispersion is displaced by the hydrocarbon to a distance of at least about 20 feet outwardly from the well bore. The effect of this displacement is to render the oil-bearing sands immediately adjacent the well bore oil wet and thus improve the relative permeability to crude oil. Also, it is postulated that adversities due to skin damage are overcome. Result of the invention is to improve the productivity index of the producing well, thus facilitating movement of the oil to the well bore.

One of the purposes of this stimulation process is to miscibly displace formation water near the well bore and replace the water with oil—this results in alteration of the relative permeability to oil in the oil-bearing sand immediately adjacent the well bore. The formation water is not removed up-hole but is dispersed out into the reservoir in such a manner as to discount the adverse influence of water saturation on high relative permeabilities to oil. Desirably, the area immediately adjacent the well bore is 100% saturated with oil after this invention is effected in the reservoir.

This invention is particularly applicable to "wateredout" oil wells wherein high water saturation near the well bore decreases the relative permeability to oil and thus restricts oil productivity. Such a watered-out well can be renewed to a producing oil well by reducing the water saturation of the area adjacent the well bore. When the well is returned to production, the near well bore relative permeabilities will encourage the flow of oil and discourage the flow of water.

It is intended that the invention not be limited by any specific information contained herein. Rather, it is intended that all equivalents in the particular art be incorporated within the invention as defined by the specification and appended claims.

What is claimed is:

1. A process of increasing the crude oil production from a producing means in fluid communication with an oil-bearing subterranean formation, the method comprising:
    (1) injecting into the well bore an oil-external micellar dispersion in amounts sufficient to displace substantially all water from no more than the pore space adjacent the well bore to a distance of 3 to about 20 feet, then
    (2) injecting hydrocarbon into the pore space adjacent the well bore in amounts sufficient to displace the micellar dispersion out into the formation, thereafter
    (3) permitting the well to reproduce.

2. The process of claim 1 wherein the micellar dispersion is permitted to remain in the pore space adjacent the well bore for a period of time up to about 12 hours.

3. The process of claim 1 wherein from about 0.5 to about 10 barrels of micellar dispersion per vertical foot of oil-bearing sand is injected into the pore space.

4. The process of claim 1 wherein crude oil is injected in amounts sufficient to displace the micellar dispersion out into the formation to a distance beyond at least about 20 feet.

5. The process of claim 1 wherein the micellar dispersion is characterized as being hydrophilic.

6. The process of claim 1 wherein the dispersion and hydrocarbon are injected into the reservoir at a pressure less than the formation fracture pressure.

7. A process of increasing the relative permeability to oil of sands adjacent a well bore in fluid communication with an oil-bearing subterranean formation, the method comprising injecting into the well bore an oil-external micellar dispersion in amounts sufficient to displace substantially all water from no more than the pore space adjacent the well bore to a distance of 3 to about 20 feet and then injecting sufficient hydrocarbon in the well bore to displace the micellar dispersion out into the formation.

8. The process of claim 7 wherein crude oil characteristic of the subterranean formation is injected after the micellar dispersion.

9. The process of claim 7 wherein 0.5 to about 10 barrels of micellar dispersion per vertical foot of oil-bearing sand is injected into the formation.

10. The process of claim 7 wherein the dispersion and hydrocarbon are injected into the reservoir at a pressure less than the formation fracture pressure.

11. A process of improving the productivity index of a producing well in fluid communication with an oil-bearing subterranean formation, the process comprising:
    (1) injecting into the well bore from about 0.5 to about 10 barrels of an oil-external micellar dispersion per vertical foot of oil-bearing sand, and then
    (2) injecting into the well bore hydrocarbon to displace the dispersion out into the formation.

12. The process of claim 11 wherein the mobility of the dispersion is about equal to or less than the mobility of the formation fluids.

13. The process of claim 11 wherein from about 1 to about 5 barrels of dispersion are injected into the well bore.

14. The process of claim 11 wherein sufficient hydrocarbon is injected into the well bore to displace the dispersion out into the formation to a distance of at least about 20 feet.

15. The process of claim 11 wherein the dispersion and hydrocarbon are injected at a pressure less than about the formation fracture pressure.

References Cited

UNITED STATES PATENTS

| | | | |
|---|---|---|---|
| 2,356,205 | 8/1944 | Blair et al. | 252—8.55 |
| 2,356,254 | 8/1944 | Lehmann et al. | 252—8.55 |
| 3,131,759 | 5/1964 | Slusser et al. | 166—2 |
| 3,149,669 | 9/1964 | Binder et al | 166—9 |
| 3,149,673 | 9/1964 | Pennington | 166—42 |
| 3,254,714 | 6/1966 | Gogarty et al. | 166—9 |
| 3,275,075 | 9/1966 | Gogarty et al. | 166—9 |
| 3,285,341 | 11/1966 | Parker | 166—42 |
| 3,301,325 | 1/1967 | Gogarty et al. | 166—9 |
| 3,307,628 | 3/1967 | Sena | 166—9 |

STEPHEN J. NOVOSAD, Primary Examiner